TIME-SHARED TELEPHONE RINGING ARRANGEMENT

Filed Oct. 12, 1966 2 Sheets-Sheet 1

INVENTOR
A. FEINER
BY
Charles H. Davis
ATTORNEY

Jan. 27, 1970 A. FEINER ET AL 3,492,437

TIME-SHARED TELEPHONE RINGING ARRANGEMENT

Filed Oct. 12, 1966 2 Sheets-Sheet 2

3,492,437

TIME-SHARED TELEPHONE RINGING ARRANGEMENT

Alexander Feiner, Chicago, Ill., assignor to Bell Telephone Laboratories, Incorporated, Murray Hill and Berkeley Heights, N.J., a corporation of New York Filed Oct. 12, 1966, Ser. No. 586,266

Int. Cl. H04m *3/00*

U.S. Cl. 179—18 12 Claims

ABSTRACT OF THE DISCLOSURE

An arrangement for ringing telephone stations is disclosed. A common ringing circuit is time-shared by a plurality of trunks and is coupled to each trunk only during the ringing interval for that trunk. Answer supervision is detected by the ringing circuit during the ringing interval and by the trunk circuit during the silent interval. The sequence in which trunks are rung can be altered according to the needs of the trunks.

Figure 1:
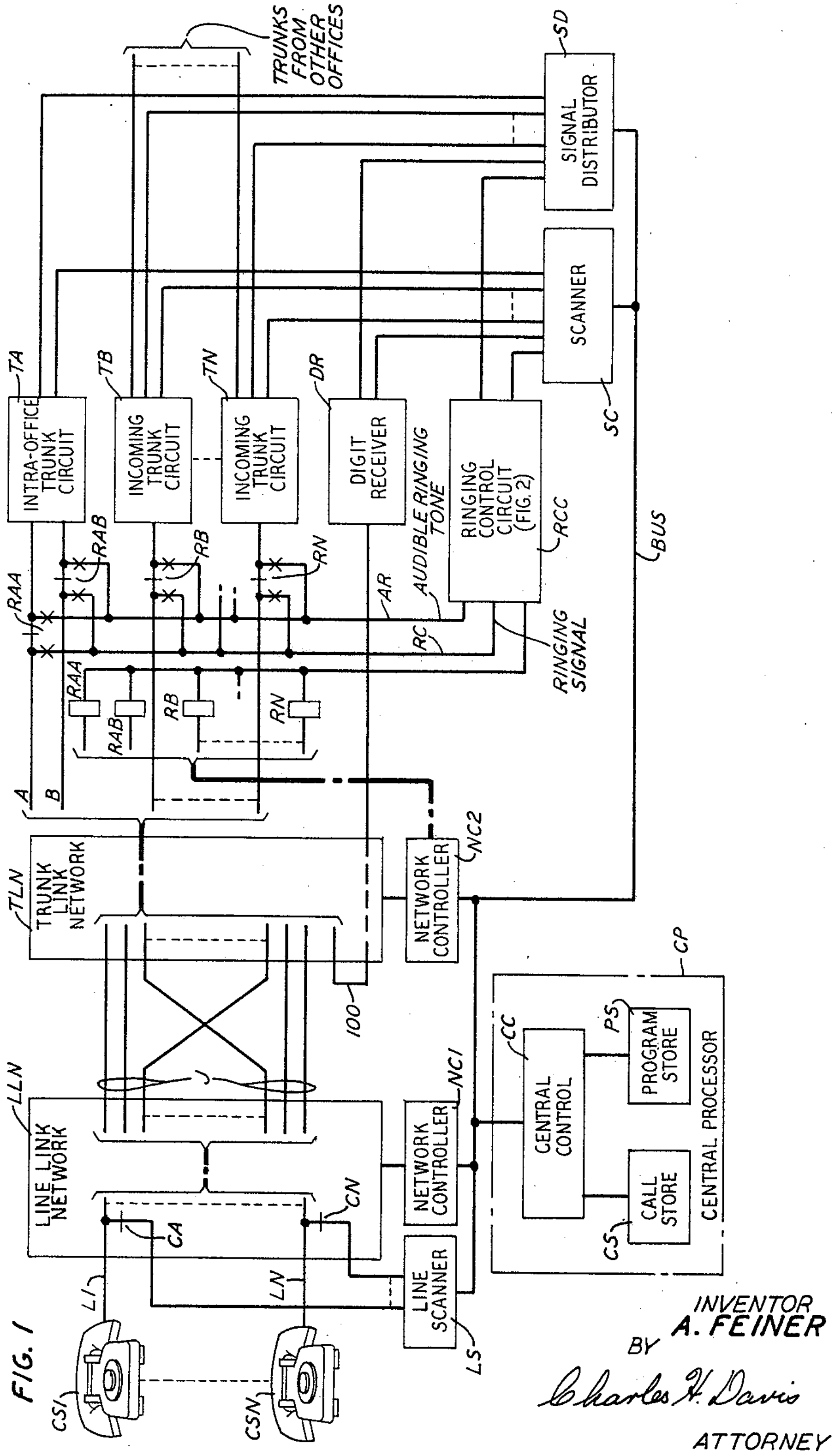

This invention relates to telephone signaling systems and particularly to arrangements for alerting called stations in such systems. In a more particular aspect this invention relates to facilities for actuating an electroacoustical device, such as a ringer, at a called telephone station to alert the customer of the presence of an incoming call.

In certain prior art telephone systems it has been common practice to supply ringing current to a called telephone line via the trunk circuit. This has been accomplished by connecting each trunk circuit to a ringing power source and applying the ringing current to the called line directly from the trunk, or in some instances, by providing a ringing selection switch associated with a group of trunks. In the latter arrangement the trunk circuit is selectively coupled to the appropriate ringing power bus via the ringing selection switch. The ringing selection switch, however, merely provides means for connecting a trunk circuit with a source of ringing power and the trunk must still control the ringing. Each trunk circuit, therefore, is usually provided with a relay or similar device which detects answer supervision from the called station to interrupt the ringing signal. Exemplary of this type of ringing arrangement is the crossbar switching system disclosed in Patent 2,585,904 to A. J. Busch of Feb. 19, 1952.

While these arrangements are well suited for their intended purposes, it will be realized that systems like these require a duplication of certain ringing facilities such as an individual ring-trip relay for each trunk circuit.

It is therefore an object of my invention to concentrate the required ringing control circuitry in individual units of equipment that can be shared by a plurality of trunk circuits.

In other telephone switching systems the ringing control facilities are centralized in a common ringing control circuit which is coupled to the called line prior to interconnecting the calling line with the called line. One example of such a system is disclosed in Patent 3,378,650 of Apr. 16, 1968 to L. F. Goeller, Jr.

In the Goeller disclosure, a plurality of ringing control circuits is provided and each such circuit is capable of performing various tests on the called line and then transmitting a coded ringing signal to the called station. The coded signal generally comprises an active interval followed by an inactive or silent interval. During the active or ringing period, ringing current is transmitted to the called station and an audible ringing tone is returned to the calling station. This sequence of ringing and silent intervals continues until the called customer answers, interrupting the signal, or until the calling customer abandons the call.

While these ringing arrangements advantageously provide means for performing line leakage tests and tests to determine the presence of a foreign potential, these arrangements lack certain novel features which have been incorporated in the present invention.

In the Goeller disclosure, for example, when a line is to be rung, the common control equipment must establish several separate network connections. First, the common control interconnects the called line over the network to a ringing control circuit which transmits bursts of ringing current to actuate the ringer at the called station. Secondly, the common control equipment interconnects the trunk (on which the calling customer is waiting) with an audible ringing tone source. This audible tone informs the calling customer that the called line is being rung. Lastly, the common control reserves a network channel to interconnect the trunk with the called line.

When the called party answers, the ringing control circuit interrupts the ringing signal. The common control equipment then releases the called line from the ringing control circuit and releases the trunk circuit from the audible ringing tone source. Once these "ringing" connections have been released, the reserved "talking" connection is established between the trunk and the called line.

While these arrangements are wholly suitable for their intended purposes, it is obvious that such arrangements require the establishment of several connections through the network to terminate each call to a called customer. This necessitates that ample network channels be provided, and moreover, the common control equipment is kept busy hunting and testing for the availability of the numerous paths required to establish the connections.

It is, therefore, another object of my invention to reduce and simplify the arrangements required for ringing in a telephone system.

In accordance with one illustrative embodiment of my invention, a ringing control circuit is associated with a plurality of trunk circuits in a telephone switching system. A program controlled data processor cooperates with the trunk circuits and other equipment to establish connections through the switching network in order to interconnect the trunk circuits with the customer lines. When the trunk circuit is connected to a called customer line, a ringing signal must be transmitted over the line to actuate the ringer at the called station and alert the customer thereat. This ringing function is accomplished in the illustrative embodiment of the present invention by sequentially coupling the ringing control circuit to those trunks which require ringing. The ringing control circuit is only coupled to a particular trunk to provide the ringing signal, and between ringing signals, i.e., during the silent interval on any one trunk circuit, the ringing control circuit may be selectively coupled to other trunks to transmit a burst of ringing current over these trunks as required. In other words, if it is assumed that three hypothetical trunk circuits TA, TB, and TN are each connected to a different called customer line requiring a ringing signal, the data processor would sequentially connect the ringing control circuit first to trunk TA for a ringing interval, then to trunk TB for a ringing interval, and finally to trunk TN for a ringing interval before applying a second ringing burst to trunk TA. Answer supervision during a silent interval is detected by scanning the individual trunk circuits. If the called station should answer during a ringing interval, the ringing control circuit will automatically disconnect from that trunk and be available to serve other trunks. Thus, many trunks can share a common ringing control circuit with this arrangement since the ringing interval generally occupies less than about ten percent of the total trunk occupancy.

A feature of my invention is found in a telephone switching system having a common ringing facility which is time-shared among a plurality of trunk circuits.

Another feature of my invention is found in the means for sequentially coupling a common ringing facility to a trunk only during the period that the ringing signal is required.

Still another feature of my invention resides in the means for detecting answer supervision during the ringing and silent intervals.

Figure 2:
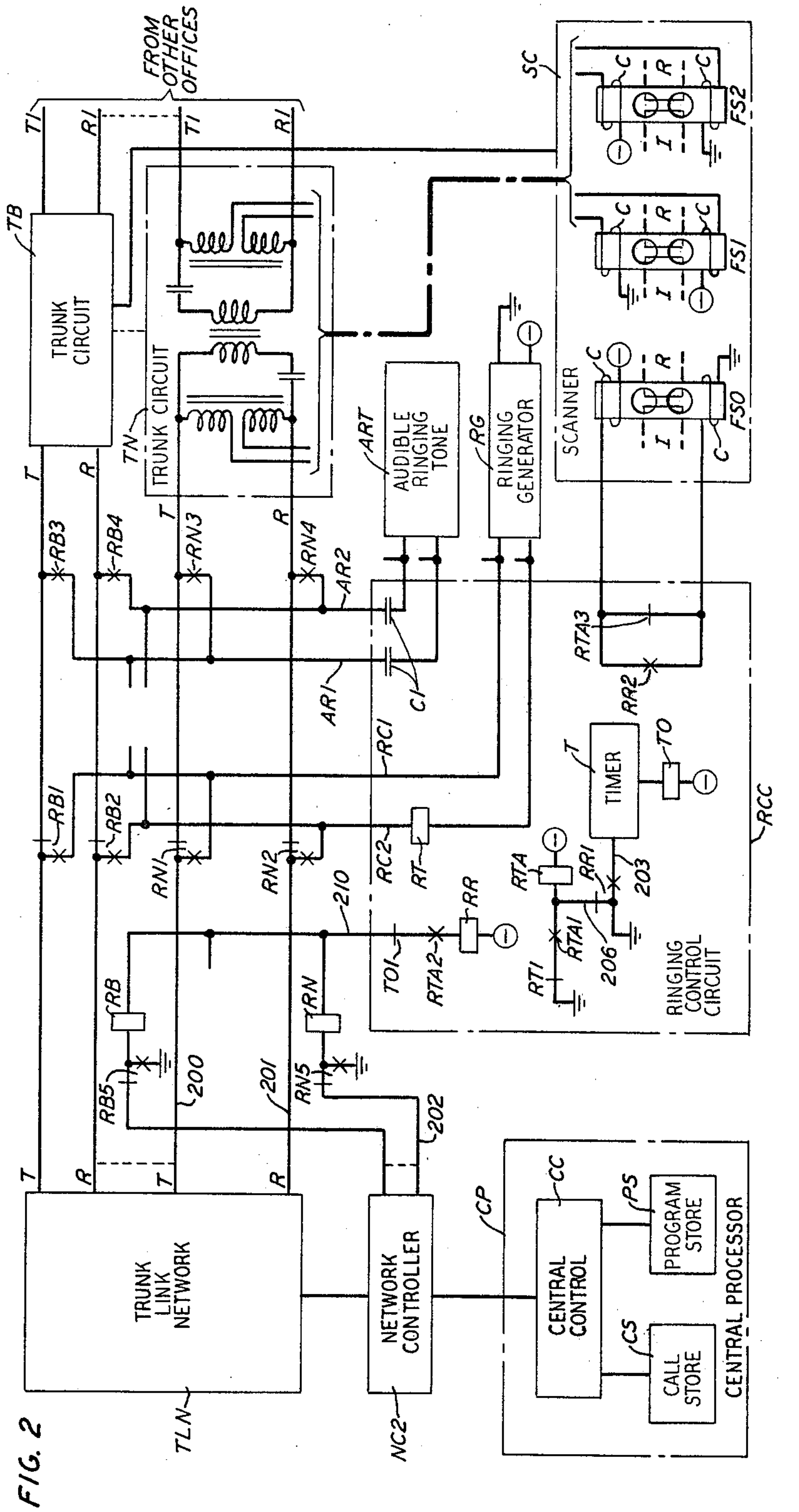

These and other objects and features of the invention will become readily apparent from the following description made with reference to the drawing in which:

FIG. 1 shows, in block diagram form, a program controlled telephone switching system employing the invention; and FIG. 2 shows, schematically, a typical ringing control circuit and its association with other elements of the telephone system.

The equipment embodying the principles of my invention has been designed for incorporation in a program controlled electronic switching system of the type disclosed in the Bell System Technical Journal, vol. XLIII of September 1964, and also disclosed in the copending patent application of A. H. Doblmaier, R. W. Downing, M. P. Fabisch, J. A. Harr, H. F. May, J. S. Nowak, F. F. Taylor, W. Ulrich, Ser. No. 334,875, filed Dec. 31, 1963. The Bell System Technical Journal article, the Doblmaier et al. disclosure and the patent applications cited therein are hereby incorporated by reference as though fully disclosed herein. While the cited Doblmaier et al. disclosure and the references cited therein or the Bell System Technical Journal may be consulted for a more complete understanding of the construction and operation of the electronic switching system, a full understanding of that switching system is not necessary for an appreciation of the nature and scope of my invention. However, to aid the reader a brief and general description of that system will be given with reference to FIG. 1.

Brief description

The electronic switching system is designed to serve many customer stations such as stations CS1 and CSN. These stations are connected to the switching office over lines such as lines L1 and LN which terminate in the line link network LLN and the line scanner LS. The line scanner LS is employed for sensing on-hook and off-hook signals representing requests for service from lines L1 and LN.

The line link network LLN comprises switching facilities for establishing communication paths between the customers lines L1–LN and the trunk link network TLN over junctors J. The trunk link network TLN has similar switching facilities for interconnecting junctors J with trunk circuits such as circuits TA, TB, and TN. Trunk circuits, such as TB and TN, can be connected to other switching offices or they may have two appearances A and B in the same office, such as trunk TA, for completing intraoffice calls.

As set forth in the above-mentioned Doblmaier et al. application, most of the logic, control, storage, supervisory, and translating functions that are required for the operation of the system are performed by the common control equipment comprising the central processor CP. Accordingly, a minimal amount of control circuitry is needed in the individual trunk circuits, and this circuitry can be actuated by a signal distributor SD which acts as a buffer between the high speed central processor CP and the slower speed trunk circuits.

In a similar manner, buffer circuits designated herein as network controllers NC1 and NC2 are provided between the central control CC and the line and trunk link networks. The network controllers receive instructions from the central control and store the instructions in buffer registers. This information is used by a translator in the controller to actuate equipment in the networks or to couple a ringing control circuit to an established connection as will be described in more detail below.

Communication between the central processor CP, the network controllers NC1 and NC2, signal distributor SD, and scanners LS and SC is over a multiconductor bus system BUS.

As shown in the Doblmaier et al. disclosure, the central processor CP is a data processing facility for implementing the various administrative, operational and maintenance functions of the system. The central processor CP can be divided functionally into the central control unit CC, the call store CS, and the program store PS. The call store CS has an erasable memory for storing information pertaining to the availability of trunks and information pertaining to calls in progress, such as the availability of a communication path through the line and trunk link networks.

On the other hand, the program store PS has a memory which is employed to store work and maintenance programs which are not altered frequently such as the line link network location associated with a particular telephone directory number.

The central control CC is the primary information processing unit of the switching system. It is capable of executing many different types of basic instructions or orders for controlling the line link network, the trunk link network, and trunk circuits as well as other functional circuits. These instructions are recorded in program store PS and are used to inform the switching circuits of the system how and when to perform their various functions. The central control CC requests instructions from program store PS and executes, or commands the appropriate circuit to execute, the proper function. Thus, being the hub of the switching system, the central control CC also receives back answers from the units which it commands.

Incoming call

The manner in which the system completes an incoming call will now be described, as it will be helpful for a clearer understanding of the present ringing arrangement.

When an interoffice trunk facility is seized at its originating office, a trunk connect signal is transmitted over the trunk to the terminating office trunk circuit such as trunk circuit TN in FIG. 1. This trunk connect signal is detected by scanner SC which continually scans the supervisory condition of trunks. As set forth in the Doblmaier et al. disclosure, the central control CC reads out of scanner SC the supervisory condition of the trunk circuit TN and consults the busy-idle information in call store CS to make sure that the trunk connect signal had not been previously observed.

The central control CC then seizes an incoming register in call store CS and records the trunk network location of the incoming trunk in the incoming register circuit. The central control CC determines the type of pulsing that will be received over the incoming trunk circuit TN and utilizes the trunk link network TLN to connect an appropriate digit receiver to the trunk circuit. Digit receiver DR is shown in FIG. 1, and it can be connected to any one of the trunk circuits over network connection 100.

The incoming register associated with digit receiver DR is now prepared to receive the called number as it is outpulsed from the distant office. When the last digit is received, the central control CC effects a translation of that number to obtain the line link equipment number and terminating class features of the called line. The central control CC thereafter converts the received line equipment number to the location of the line busy-idle data in the call store CS to determine if the called line is busy or idle.

In the above-identified Doblmaier et al. disclosure, the central control CC then connected an audible ringing tone circuit to the incoming trunk, using a network channel in the trunk link network TLN, and also connected a ringing control circuit over a network channel to the called line, such as line LN, using facilities on both the line link and trunk link networks. Furthermore, the central control reserved a "talking" path between the incoming trunk and the called line to be used when the called party answered. With that arrangement, the incoming trunk was scanned for a possible abandoned call signal from the calling subscriber, while the ringing circuit was scanned for called line answer supervision. If the called party answered by lifting his receiver, the ringing connection between his line and the ringing control circuit was released, and the audible ringing tone connection between the incoming trunk and the audible ringing tone circuit was released. The reserved "talking" path was then used to interconnect the incoming trunk with the called line.

As can be seen from the above description of the Doblmaier et al. disclosure, each time a line in that switching system is called, separate network paths are established for ringing and for the audible ringing tone. Moreover, the ringing control circuit and audible ringing tone circuit are coupled to the called and calling lines, respectively, for the entire time that ringing is required on the called line, and these circuits cannot serve other calls until the called party answers, or until the call is abandoned by the calling party.

In accordance with one aspect of my invention, ringing control and audible ringing circuits are not coupled over separate network connections to the called and calling lines as in Doblmaier et al., but instead, the network "talking" connection including a trunk circuit is immediately established between the calling and called lines.

Associated with a plurality of the trunk circuits such as circuits TA, TB, and TN is a ringing control circuit RCC which can be selectively coupled to the trunk circuits under control of the central control CC. Depending on which trunk requires a ringing signal, central control CC will operate, via network controller NC2, one of the relay gates RAA, RAB, RB, or RN to couple the ringing control circuit with that trunk.

For example, let is be assumed that intraoffice trunk TA has a called customer connected over the line and trunk link networks LLN and TLN to its B appearance. Similarly, incoming trunks TB and TN are connected over network channels to other called lines. The central control CC would first operate relay RAB to couple the ringing control circuit RCC to the B appearance of trunk circuit TA. The ringing control circuit remains coupled to trunk circuit TA for the ringing interval and automatically disconnects at the end of the ringing interval or when the called party answers. Once the ringing control circuit is disconnected from trunk circuit TA, the central control can operate relay RB or RN to couple the ringing control circuit to trunk circuit TB or TN. Thus, the central control can selectively operate the appropriate relay gate (R—) to couple ringing control circuit RCC to those trunks which require ringing. Each of these relay gates might be operated for a two-second interval to provide the two-second conventional ringing burst followed by a silent interval.

When a relay gate, such as RN, is operated, the audible ringing tone is transmitted from ringing control circuit RCC, over conductors AR and through operated make contacts of relay RN, to the incoming trunk circuit to inform the calling customer that a ringing signal is being applied to the called line. At the same time, ringing current is transmitted over conductors RC, through other make contacts of relay RN and over the network channel to actuate an electroresponsive device such as the ringer at the called customer station.

After relay RN has been operated for the two-second ringing interval or if the rung station answers, the ringing control circuit RCC is disconnected from trunk circuit TN and is available to serve other calls. Trunk circuit TN is disconnected from ringing control circuit RCC for a period equivalent to the silent interval of the ringing code, and it is during this interval that ringing control circuit RCC can be coupled to other trunk circuits to provide ringing current and audible ringing tone for these trunks.

Answer supervision effects a ring trip function in either one of two ways. During the ringing interval, that is, when ringing control circuit RCC is connected to a particular trunk circuit, an answer supervisory signal from the called customer connected to that trunk causes the ringing control circuit RCC automatically to disconnect from the trunk thereby removing the ringing signal. During the silent interval when the customer's line is reconnected to the trunk circuit, answer supervision can be detected by scanner SC in a well-known manner. In either event, the central processor CP is informed by scanning the trunk circuit that the called customer connected to a particular trunk has answered and that the ringing control RCC need not be reconnected to that trunk to provide additional ringing signals.

Thus, it can be seen from the above description that a ringing control circuit is time-shared among a plurality of trunk circuits and selectively coupled to the connection between a called line and a trunk only when ringing is required. Moreover, to increase the network flexibility and to provide a low probability of blocking, intraoffice trunks can be symmetrical, that is, have ringing applied to either the A or B appearance as shown in FIG. 1.

Detailed description

In order for the reader to gain a better appreciation of the nature and scope of the problems solved by my invention, a more detailed description of the invention will now be given with respect to FIG. 2. FIG. 2 shows a portion of the telephone switching system which has been described herein with reference to FIG. 1 and which is based on the switching system disclosed in more detail in the above-identified application of Doblmaier et al. Only a portion of that system has been shown herein to simplify the drawing.

The switching system comprises a trunk link network TLN in which trunks and service circuits are terminated and in which junctors to the line link network are terminated. For ease of illustration, only incoming trunks TB and TN have been shown. While certain aspects of the trunk link network TLN are set forth in the Doblmaier et al. disclosure a more detailed description of the network can be found in Patent 3,257,513 of June 21, 1966 to A. Feiner, Patent 3,281,539 of Oct. 25, 1966 to K. S. Dunlap, A. Feiner, R. W. Ketchledge, H. F. May and in Patent 3,231,679 to T. N. Lowry of Jan. 25, 1966. Since the trunk link network forms no part of the present invention a further description of this network will not be given herein.

A more detailed disclosure of the incoming trunk circuits can be found in FIG. 104 of the above-cited Doblmaier et al. disclosure and need not be shown herein for a full understanding of the present invention. Instead, it will be sufficient to indicate that each incoming trunk is terminated in trunk link network TLN over a pair of conductors T and R and the trunk circuits are connected over a pair of conductors T1 and R1 to their originating office.

The trunk circuits are equipped with pairs of scanning leads and each pair of scanning leads is associated with a ferrod sensor in scanner SC. The ferrod sensor is a current sensitive device which is used to monitor the flow of current in a pair of wires. Each ferrod is essentially a transformer comprising a rod of ferrite material with two control windings C, an interrogate winding I and a readout winding R. The control windings are connected to the pair of wires to be monitored and the magnetic coupling between the interrogate and readout windings is determined by the current flow in the control windings. Thus, when a ferrod sensor such as FS1 in FIG. 2 is connected to the tip and ring conductors through the switching network to a called customer's line, the ferrod sensor can detect on-hook and off-hook signals from the called station. The ferrod sensors are further disclosed in Patent 3,175,042 to J. A. Baldwin, H. F. May of Mar. 23, 1965.

As set forth in the above-identified Doblmaier et al. disclosure, most of the control functions are performed by the central processor CP. Accordingly, the individual trunk circuits need only be equipped with the essential transmission and switching devices, and these switching devices, in most instances, are magnetic latching relays which are controlled by signal distributor SD. Signal distributor SD functions as a buffer circuit between the high speed data processor CP and the slower speed relays, whereby the trunks are switched into different functional states by the signal distributor SD under control of programmed instructions from central processor CP.

Also shown in FIG. 2 is a portion of a ringing control circuit RCC. As disclosed in Patent 3,378,650 of Apr. 16, 1968 to L. F. Goeller, such ringing control circuits are sometimes equipped for testing a customer's line for leakage resistance, foreign potential, etc. Since the circuitry for performing these and similar tests is not necessary for a full understanding of the present invention, this circuitry has not been disclosed in the present drawing, and it will be obvious to one skilled in the art how these features may be employed in the present invention.

The ringing control circuit RCC can be selectively coupled to the trunk circuits TB and TN through the operation of relays RB and RN. These relays are operated via network controller NC2 which acts as a buffer circuit between the high speed central control CC and the slower acting relays.

Network controller NC2 receives instructions from central control CC and stores these instructions in buffer registers. This stored information is then utilized by a translator to activate the relays or other equipment in the trunk link network.

The ringing control circuit is also coupled to a ringing generator RG which delivers ringing current to actuate a telephone ringer at a called customer's station and an audible ringing tone source ART which furnishes an audible ringing tone to a calling customer to indicate that the called station is being rung. In addition, ringing control circuit RCC comprises ringing trip and control circuitry, the function of which will become apparent with the subsequent description of the operation of the arrangement in connection with an incoming call.

Incoming call

To illustrate the operation of this system let it be assumed that trunk circuit TN has been seized at its originating office (not shown) and trunk TN is to be connected over trunk link network TLN to a called station in the local switching office, part of which is shown in FIG. 2. When trunk circuit TN is seized at the distant office, a loop circuit, including conductors T1 and R1 associated with trunk circuit TN, is completed and current flows in the control windings of ferrod sensor FS2 located in scanner circuits SC. As set forth in the Doblmaier et al. disclosure, the central control CC of the central processor CP reads the supervisory condition of trunk circuit TN out of scanner SC, and consults the busy-idle condition information in a call store CS to make sure that the trunk connect signal had not been previously observed.

The central control then seizes an incoming register in call store CS and records the trunk network location of the incoming trunk circuit in the incoming register. The central control then determines the type of pulsing that will be received over the incoming trunk circuit TN and connects an appropriate digit receiver over the trunk link network to the incoming trunk circuit. The connection of the digit receiver to an incoming trunk has been described above with reference to the block diagram of FIG. 1.

The incoming register associated with the digit receiver is now prepared to receive the called telephone number as it is outpulsed from the distant office. When the last digit is received the central control effects a translation of the called number to obtain the line link network equipment location of the called line. The central control thereafter converts the received line equipment number to a location of the busy-idle data in the call store to determine if the called line is busy or idle.

For purposes of illustration it will be assumed that the called line is idle; the central control CC then consults a memory unit to ascertain the availability of a channel between the called line and the incoming trunk TN. Once an idle channel is found, the central control interconnects the incoming trunk with the called line over that channel. The central control is then programmed to identify the ringing control circuit RCC associated with the incoming trunk TN, in preparation for coupling that ringing control circuit to the connection to provide the proper ringing signal.

If it is assumed that the trunk circuit TN is the only circuit requiring a ringing signal from ringing control circuit RCC, the central control CC causes network controller NC2 to immediately operate relays RN and RR. The circuit for operating these relays includes ground connected to conductor 202 by network controller NC2, break contacts RN5, the winding of relay RN, conductor 210, break contacts TO1, make contacts RTA2, the winding of relay RR and battery. Relay RTA is normally held operated in a circuit traced from ground through break contacts RT1 of ringing trip relay RT, through operated contacts RTA1 and through the winding of relay RTA to battery. Relays RN and RR, in operating, lock to ground through the make contacts RN5.

At this time, with the ringing control circuit RCC coupled to the connection between incoming trunk TN and a called station, the various leakage resistance and foreign potential tests may be performed by circuitry in the ringing control circuit RCC as set forth in the aforementioned Goeller disclosure. The circuitry for performing these tests has not been shown to simplify the present drawing.

When relay RN operates it completes a path for applying ringing current to the called station and for transmitting an audible ringing tone back over the trunk to the calling station to inform the customer thereat that the called station is being rung. The circuit for applying the ringing current to the called line comprises ringing generator RG, ring trip relay RT, conductors RC1 and RC2, operated contacts RN1 and RN2, the tip and ring conductors 200 and 201 and the network channel to the called line. The audible ringing tone is furnished from tone source ART through capacitors C1, over conductors AR1 and AR2, through operated contacts RN3 and RN4, through the coil in trunk circuit TN and over conductors T1 and R1 of trunk circuit TN to the calling office to inform the customer thereat that the called station is being rung.

When relay RR operates it closes its make contacts RR2 to complete a path permitting current to flow in the control windings C of ferrod sensor FSO in scanner SC. This informs the scanner SC and the central processor CP that ringing control circuit RCC is already connected to a trunk circuit and cannot be used during this ringing interval for supplying ringing to another connection. The path for energizing the control windings of ferrod sensor FSO can also be completed through break contacts RTA3 which will be closed if the called party trips the ringing signal during the ringing interval as described below.

When relay RR operates it also closes its make contacts RR1 to extend ground over conductor 203 to timer T. Timer T begins timing the interval during which ringing control circuit RCC will be connected to a particular trunk circuit to provide the ringing signal. For purposes of illustration it will be assumed that the ringing signal comprises a two-second ringing burst every six seconds, and therefore, timer T is a two-second timer.

After the two-second interval determined by timer T, timeout relay TO operates opening its break contacts TO1. With contacts TO1 opened, relays RN and RR release, and relay RN at its contacts RN1–RN4 disconnects the ringing control circuit RCC from trunk circuit TN.

When relay RR releases, its make contact RR1 opens to remove ground from conductor 203 to recycle the timer circuit T in preparation for timing another ringing interval. Relay RR also opens its make contacts RR2 to remove the ringing control circuit make-busy condition as detected by ferrod sensor FSO.

Since it has been assumed that no other trunks require ringing from ringing circuit RCC, the central control CC will wait the normal four-second silent interval before reoperating relays RN and RR to reconnect ringing control circuit RCC to trunk circuit TN for another ringing period.

Trunk circuit TN will be switched back and forth between its ringing mode and its silent mode until the calling party abandons the call, or until the called party answers. If the calling party abandons the call, the trunk seizure signal is removed from trunk conductors T1 and R1 of trunk circuit TN and current no longer flows in the control windings C of ferrod sensor FS2. When ferrod sensor FS2 is scanned by scanner SC, this on-hook condition is detected and the central control CC proceeds to release the connection between trunk TN and the called line. The central control CC would, of course, recognize the abandoned call and not reconnect the ringing control circuit RCC to the trunk connection.

Should the called party respond to the ringing signal before the calling party abandons the call, the called party's answer supervision will be detected and the ringing signal will be removed from the connection. During the silent intervals, when ringing control circuit RCC is disconnected from the trunk and relay RN is normal, the called party off-hook condition is detected by current flowing in the control windings of ferrod sensor FS1. This off-hook signal is recognized by central control CC so that the central control will block the connection of ringing control circuit RCC from trunk circuit TN for the duration of the call.

In the event that the called party lifts his receiver during a ringing cycle, the ringing signal is automatically interrupted by ringing control circuit RCC. More specifically, when the called customer goes off-hook a low impedance is placed across the tip and ring conductors 200 and 201 causing ring trip relay RT to operate in a well-known manner. When ring trip relay RT operates, it opens its break contacts RT1 interrupting the holding circuit for relay RTA which releases. In releasing, relay RTA opens its make contacts RTA2 to interrupt the holding circuit for relays RR and RN, and relay RN disconnects ringing control circuit RCC from the connection to trunk circuit TN. Once relay RR restores to normal, a circuit is completed from ground through break contacts RR1 and over conductor 206 for reoperating relay RTA in preparation for the next call.

Furthermore, when relay RN releases as a result of the called station answering during the ringing interval, the trunk circuit is reconnected to the called line and the low impedance of the called station in its off-hook state is detected by ferrod sensor FS1 in scanner SC so that the central control is informed not to reconnect the ringing control circuit RCC to trunk circuit TN to provide another burst of ringing current.

In the above described example it was assumed that only trunk circuit TN required ringing and, therefore, ringing control circuit RCC was only in use during the two-second interval that it was connected to trunk circuit TN. If other trunk circuits required ringing, central control CC would cause network controller NC2 to operate the relays (RAA, RAB, RB, etc.) associated with these trunks to successively connect the ringing control circuits to each of the trunks. For example, if ringing was required on the B appearance of intraoffice trunk circuit TA (shown in FIG. 1) and on incoming trunk circuits TB and TN (shown in FIGS. 1 and 2), the central control CC would cause network controller NC2 to first operate relay RAB to connect ringing control circuit RCC to the B appearance of the intraoffice trunk TA for a two-second interval. At the end of the two-second interval relay RAB would release and network controller NC2 would operate relay RB to connect ringing control circuit RCC to incoming trunk circuit TB for a two-second interval. Finally, relay RN would be operated for two seconds to connect the ringing control circuit to trunk circuit TN as described above. If the call on the intraoffice trunk TA was not answered by the end of the two-second ringing burst provided for trunk TN, the central control CC would cause network controller NC2 to reoperate relay RAB to furnish another two-second ringing burst over the intraoffice trunk TA.

It is to be understood that the above described arrangements are merely illustrative of the application of the principles of the invention. Numerous other arrangements may be devised by those skilled in the art without departing from the spirit and scope of the invention. For instance, the ringing control circuit RCC could readily be equipped to provide party line or multifrequency tone ringing signals. Also, the logic circuitry for controlling the connection of the ringing control circuit to particular trunks could easily be associated with the ringing control circuit instead of the central control or network controller as described above. Furthermore, if during heavy traffic the ringing control circuit was unable efficiently to handle a large number of calls, the overflow calls could be serviced by a ringing control circuit which is connected over the switching network to the called customer in a manner similar to that described in the aforementioned Goeller patent.

What is claimed is:

1. In a communication system, a plurality of called lines having customer stations associated therewith, a plurality of communication paths, a switching network for interconnecting said lines and said paths, and signaling means for ringing said lines at recurring intervals to alert the stations associated therewith, said signaling means comprising a ringing circuit common to said paths and means for selectively coupling each of said paths individually to said ringing circuit for ringing only during an individual time segment of each of said intervals, said coupling means controllable by said network for coupling said paths to said ringing circuit for ringing during different time segments of successive intervals.

2. The invention defined in claim 1 wherein said network comprises means for ascertaining which of said called stations are to be alerted, wherein each of said called stations comprises means for returning an answer signal over said associated line after being alerted, and wherein said signaling means further comprises detecting means responsive to said answer signal for blocking the coupling of said ringing circuit to a particular path in response to answer signal over the line connected to said particular path.

3. The invention defined in claim 2 wherein each said called station comprises an electroresponsive device and wherein said ringing circuit comprises a ringing power source effective when coupled to a said path for actuating said device and an audible tone source for indicating when said ringing power source is coupled to said path.

4. The invention defined in claim 3 wherein said detecting means comprises first means responsive to said answer signal when said ringing power source is coupled to said particular path and second means responsive to said answer signal when said ringing power source is uncoupled from said particular path.

5. The invention defined in claim 4 wherein said common ringing circuit also comprises timing means for uncoupling said ringing power source from any of said paths independently of said first and second means.

6. In a telephone system, a plurality of called lines each having a customer station thereon adapted to transmit an answer signal, a plurality of trunks, a switching network for establishing communication paths from said lines to said trunks including means for ascertaining which of said paths require ringing, and means for transmitting ringing signals over said paths to said lines at recurring intervals to alert the stations thereon of the presence of calls over said trunks, said transmitting means comprising a ringing power source, means for intermittently transferring each of said paths to be alerted from said trunks to said source to receive said ringing power during an individual time segment of said interval, and means responsive to an answer signal from a called line over one of said paths for controlling said transferring means to block the transfer of said one path to said source.

7. The invention defined in claim 6 wherein said control means comprises a plurality of signal detectors each connected to a said trunk and responsive to an answer signal over a path established to said trunk, and wherein said transferring means comprises a plurality of gating means each associated with one of said paths and means for selectively enabling said gating means one at a time in accordance with the paths which require ringing signals as determined by said ascertaining means.

8. The invention defined in claim 7 wherein said transmitting means further comprises an audible tone source, and wherein each said enabled gating means comprises operated relay means including first contacts interrupting the path established between its associated trunk and said called line, second contacts connecting said ringing power source to that portion of said interrupted path connected to said called line and third contacts connecting said audible tone source to that portion of said interrupted path connected to said trunk.

9. The invention defined in claim 8 wherein said transmitting means further comprises timing circuit means effective upon the operation of any one of said relay means for timing a prescribed interval and means controlled by said timing means for releasing said operated relay means to reestablish the interrupted path to said associated trunk.

10. In a communications system, called lines, trunks, a switching network for establishing communication paths from said lines to said trunks, and means for transmitting alerting signals over said paths to said lines to alert stations connected thereto of the presence of calls over said trunks, said transmitting means comprising a source supplying alerting signal power and means responsive to the receipt of calls over said trunks for intermittently transferring each of said paths from said trunks to said source to receive said alerting signal power.

11. The invention defined in claim 10 wherein said transmitting means comprises means for cyclically transferring each of said paths from said trunks to said source in an ordered sequence to receive said alerting signals.

12. In a communication system, a plurality of called lines; a plurality of communication paths; switching means for interconnecting said lines and said paths; and signaling means for ringing said lines at recurring intervals, said signaling means comprising a ringing circuit, means for sequentially coupling one at a time each of said paths to said ringing circuit for ringing only during an individual time segment of each of said intervals, and means controlled by said switching means for selectively altering the sequence of coupling in response to different sequences of ringing requests.

References Cited

UNITED STATES PATENTS

| | | | |
|---|---|---|---|
| 3,378,650 | 4/1968 | Goeller | 179—175.2 |
| 2,924,663 | 2/1960 | Horwitz et al. | 179—17 |
| 2,535,675 | 12/1950 | Goddard | 179—18 |

KATHLEEN H. CLAFFY, Primary Examiner

T. W. BROWN, Assistant Examiner

U.S. Cl. X.R.

179—18